United States Patent
Sasaki

(10) Patent No.: US 9,964,815 B2
(45) Date of Patent: May 8, 2018

(54) LIQUID CRYSTAL DISPLAY DEVICE

(71) Applicant: NLT Technologies, Ltd., Kanagawa (JP)

(72) Inventor: Takeshi Sasaki, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 141 days.

(21) Appl. No.: 14/792,840

(22) Filed: Jul. 7, 2015

(65) Prior Publication Data

US 2016/0011472 A1 Jan. 14, 2016

(30) Foreign Application Priority Data

Jul. 10, 2014 (JP) .................................. 2014-141897

(51) Int. Cl.
*G02F 1/1343* (2006.01)
*G02F 1/1337* (2006.01)

(52) U.S. Cl.
CPC .. *G02F 1/134363* (2013.01); *G02F 1/133707* (2013.01); *G02F 2001/134372* (2013.01)

(58) Field of Classification Search
CPC ......... G02F 1/134309; G02F 1/133345; G02F 1/134363; G02F 1/133707; G02F 2001/134372
USPC ....................................................... 349/141
See application file for complete search history.

(56) References Cited

U.S. PATENT DOCUMENTS

| | | | |
|---|---|---|---|
| 6,259,503 B1 | 7/2001 | Watanabe et al. | |
| 6,583,840 B1 * | 6/2003 | Inoue ................ | G02F 1/134363 349/113 |
| 8,228,475 B2 * | 7/2012 | Kang ................ | G02F 1/133371 349/106 |
| 8,786,811 B2 * | 7/2014 | Kubota ............. | G02F 1/133707 349/141 |
| 2002/0008827 A1 | 1/2002 | Yoo et al. | |

(Continued)

FOREIGN PATENT DOCUMENTS

| | | |
|---|---|---|
| JP | 07-43721 | 2/1995 |
| JP | 3267224 | 1/2002 |
| JP | 2008-39892 | 2/2008 |

OTHER PUBLICATIONS

Japanese Office Action dated Feb. 20, 2018 in corresponding Japanese Patent Application No. 2014-141897 with JPO machine translation of Japanese Office Action.

*Primary Examiner* — Charles Chang
(74) *Attorney, Agent, or Firm* — Young & Thompson

(57) ABSTRACT

A liquid crystal display device includes a pixel electrode substrate including a pixel electrode and a counter electrode formed thereon; a counter substrate provided to face the pixel electrode substrate; and a liquid crystal interposed between the pixel electrode substrate and the counter substrate, the liquid crystal display device being of a mode that rotates liquid crystal molecules substantially in parallel to the pixel electrode substrate. In the display device, an initial alignment direction of the liquid crystal molecules is parallel to an extension direction of at least one of the pixel electrode and the counter electrode, and a pixel includes at least one convex portion or concave portion that has a long and narrow shape and whose longitudinal direction has an oblique angle with respect to the initial alignment direction of the liquid crystal molecules in the same direction as a desired liquid crystal rotation direction.

7 Claims, 27 Drawing Sheets

(56) References Cited

U.S. PATENT DOCUMENTS

2003/0020861 A1    1/2003  Yoo
2004/0196425 A1*  10/2004  Hsieh ................ G02F 1/133707
                                                            349/141
2004/0212768 A1*  10/2004  Wu .................... G02F 1/134363
                                                            349/141

* cited by examiner

①

②

③

LIQUID CRYSTAL DISPLAY DEVICE

BACKGROUND

Technical Field

The present invention relates to structures of display pixels in horizontal electric field type liquid crystal display devices (LCDs), as represented by fringe field switching mode (FFS) and in-plane switching mode (IPS).

Related Art

In horizontal electric field type LCDs, light transmittance is controlled by applying an electric field between pixel electrodes to rotate liquid crystal molecules from an initial alignment direction.

In the above LCDs, an alignment angle of the liquid crystal molecules changes depending on which direction the liquid crystal molecules rotate: right or left, whereby optical characteristics also change.

In addition, when a rightward rotating liquid crystal molecule region and a leftward rotating liquid crystal molecule region are formed in a single region, a specific region, called "disclination", occurs at a boundary between the regions. The disclination does not contribute to light transmission and thus degrades transmittance, or depending on a shape of the occurred specific region, variation occurs in transmittance of each pixel, thereby causing a problem of display unevenness.

Accordingly, in conventional horizontal electric field type LCDs, in order to specify a rotation direction of liquid crystal molecules at a time of application of voltage with respect to an initial alignment direction (a rubbing direction or a photo alignment direction) of the liquid crystal molecules, an extension direction of pixel electrodes and counter electrodes has been oriented obliquely with respect to the initial alignment direction so that the direction of electric field is not perpendicular to the initial alignment direction.

Japanese Patent No. 3267224 (Patent Literature 1) is an example of the related art, and Japanese Unexamined Patent Application Publication No. H7-43721 (Patent Literature 2) is another example of the related art.

FIGS. 7 and 8 depict examples of pixel structures of conventional ordinary horizontal electric field type liquid crystal elements; FIG. 9 is an illustrative view depicting a disorder of a liquid crystal initial alignment state at a pixel electrode side wall portion; FIG. 10 is an illustrative view depicting a polarization state of reflected light when linearly polarized light is input to and reflected by a wiring metal side wall portion; and FIG. 11 is an illustrative view depicting a direction of an electric field and a rotation direction of a liquid crystal molecule in a vicinity of an end part of a pixel electrode.

Due to the restriction mentioned above, as depicted in the examples of FIGS. 7 and 8, the direction of the electrodes is oblique with respect to the initial alignment direction, so that an entire shape of the pixels also becomes a shape like a combination of shapes having an oblique inclination with respect to the initial alignment direction. Specifically, it is inevitable to form a complicated shape, such as "a dogleg shape" (FIG. 7) or "a combination of a plurality of dogleg shapes" (FIG. 8), which has been a factor causing reduction in aperture ratio. In FIG. 7, the pixels are formed into a distorted shape due to the oblique electrode shapes. On the other hand, in FIG. 8, the pixels have a rectangular shape in which the presence of a dead space significantly reduces the aperture ratio.

In addition, as depicted in FIG. 9, the initial alignment direction and an extension direction of a stepped part around a pixel electrode are not parallel or perpendicular to each other. Thus, in an extreme vicinity of the electrode stepped part, an influence of a shape of the stepped part causes the initial alignment direction to be oriented in an extension direction of the pixel electrode, thereby causing leakage of light. Reference sign 11g denotes a liquid crystal molecule whose alignment direction has shifted due to the influence of the stepped part.

In addition, as depicted in FIG. 10, when a pixel electrode, a counter electrode, a signal line, and the like are made of metal and, at a time of reflection of linearly polarized light impinging to a side wall of the electrode or the wire, a polarization direction and a direction of the side wall are not parallel or orthogonal to each other, a polarization angle of the reflected light changes, which has been a factor causing leakage of light. An arrow of reference sign 13a denotes a polarization state of the incident light, and an arrow of reference sign 14a denotes a polarization state of the reflected light.

In addition, in the conventional horizontal electric field type LCDs, as described above, the rotation direction of liquid crystal molecules are specified by arranging the pixel electrodes and the counter electrodes obliquely with respect to the initial alignment direction to generate the direction of the electric field obliquely. However, as depicted in FIG. 11, in the vicinity of the end part of the electrode, the generation direction of the electric field radically changes to turn to the opposite rotation direction, thereby generating a region in which a part of the liquid crystal molecules are oppositely rotated. Reference sign 11h denotes an oppositely rotating liquid crystal molecule, and an arrow of reference sign 11i denotes a direction in which the electric field is easily rotated.

Additionally, since an angle is formed in the direction of the electric field with respect to the initial alignment direction of the liquid crystal molecules, rotation torque efficiency is degraded. Thus, it has been necessary to apply high voltage.

As means for solving the problems mentioned above, Patent Literature 1 in the conventional art discloses a technique in which slits are formed on insulating films provided between a pixel electrode and a common electrode, an extension direction of each slit is arranged in a direction opposite to a desired liquid crystal rotation direction to thereby bend the direction of an electric field passing through the slit in a direction perpendicular to the extension direction of the slit. This technique can provide an electric effect substantially equivalent to that obtained by arranging the electrodes obliquely with respect to an initial alignment direction. Thus, there can be obtained an advantageous effect in that the initial alignment direction and the extension direction of the pixel electrode can be made substantially parallel to each other.

In the above technique, however, the extension direction of the slit is arranged in the direction opposite to the desired liquid crystal rotation direction. Due to this, liquid crystal molecules near an edge of the slit aligned along the edge thereof tend to be aligned in a rotation direction opposite to an originally desired liquid crystal rotation direction. Thus, there has been a problem of increased risk of causing opposite rotation.

Additionally, regarding a structure that changes an alignment state by forming a plurality of projections on a pixel electrode substrate or a counter substrate, there is a known structure as disclosed in Patent Literature 2. However, the technique of Patent Literature 2 has been proposed to make large a mean value of pre-tilt angles of liquid crystal on the substrate, and thus does not consider a planar shape and a planar anisotropy of the projection structure.

Furthermore, in the above arrangement, the projection structure does not have any planar anisotropy, as mentioned above, and therefore has no influence on a rotation direction of liquid crystal molecules in the horizontal electric field type liquid crystal display device.

SUMMARY

The present invention is directed to solve the problems described above. Specifically, it is an object of the invention to provide a horizontal electric field type liquid crystal display device that has high aperture ratio, suppresses disclination, and is driven at low voltage.

In order to solve the above-described problems, a liquid crystal display device according to an aspect of the present invention includes a pixel electrode substrate including a pixel electrode and a counter electrode formed thereon; a counter substrate provided to face the pixel electrode substrate; and a liquid crystal interposed between the pixel electrode substrate and the counter substrate, the liquid crystal display device being of a mode that rotates liquid crystal molecules substantially in parallel to the pixel electrode substrate, in which an initial alignment direction of the liquid crystal molecules is parallel to an extension direction of at least one of the pixel electrode and the counter electrode; and a pixel includes at least one convex portion or concave portion that has a long and narrow shape and whose longitudinal direction has an oblique angle with respect to the initial alignment direction of the liquid crystal molecules in the same direction as a desired liquid crystal rotation direction.

A liquid crystal display device according to another aspect of the present invention includes a pixel electrode substrate including a pixel electrode and a counter electrode formed thereon; a counter substrate provided to face the pixel electrode substrate; and a liquid crystal interposed between the pixel electrode substrate and the counter substrate, the liquid crystal display device being of a mode that rotates liquid crystal molecules substantially in parallel to the pixel electrode substrate, in which a pixel includes at least one convex portion or concave portion that has a long and narrow shape and whose longitudinal direction has an inclination with respect to an initial alignment direction of the liquid crystal molecules in a direction opposite to an inclination direction of an extension direction of at least one of the pixel electrode and the counter electrode with respect to the initial alignment direction of the liquid crystal molecules.

A direction in which it is easy or difficult to rotate liquid crystal can be made by forming a concave or convex portion having a long and narrow shape on a region of a pixel electrode substrate surface or a counter substrate surface with which the liquid crystal molecules contact and arranging an extension direction of the concave or convex portion obliquely with respect to an initial alignment direction.

Conventionally, in order to electrically control the rotation direction of liquid crystal molecules, there have been limitations to the shapes and arrangements of a pixel electrode and a counter electrode. However, since the concave or convex structure described above allows control of the rotation direction thereof, flexibilities for the shapes and arrangements of a pixel electrode and a counter electrode are increased, thereby allowing increase in aperture ratio.

In addition, since the initial alignment direction of the liquid crystal molecules and the direction of application of an electric field can be made substantially perpendicular to each other, the liquid crystal can be efficiently rotated, so that a voltage to be applied can be made low.

Furthermore, even when an opposite rotation region is partially generated for some reason, it is easy to return to forward rotation. Thus, problems due to disclination are less likely to occur.

DETAILED DESCRIPTION OF THE INVENTION

Hereinafter, a structure of a liquid crystal display device according to an embodiment of the present invention will be described with reference to the drawings.

First Embodiment

Figure 16A:
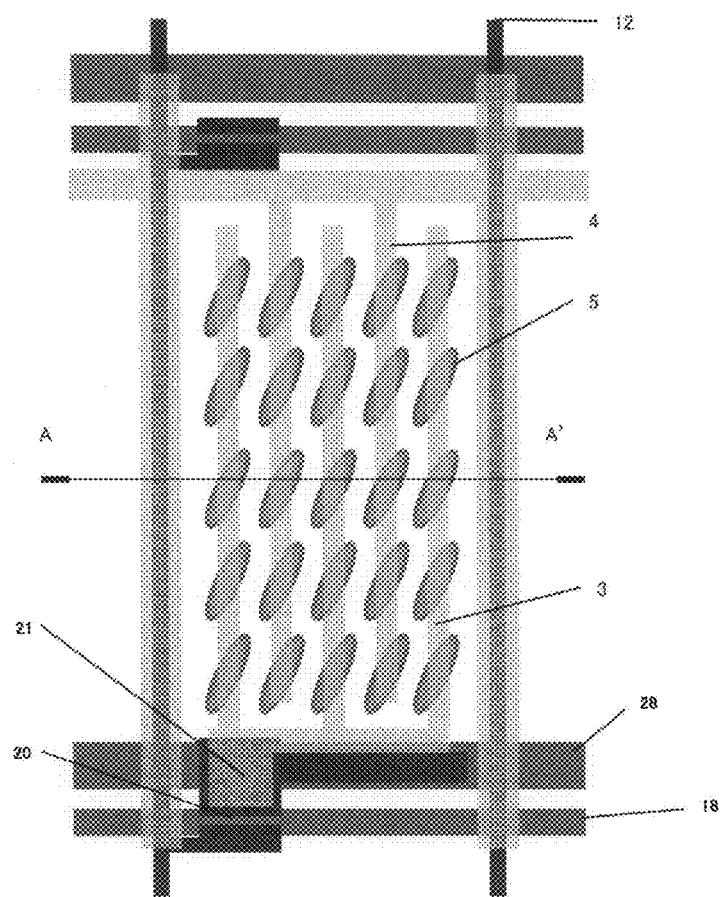
FIG. 16A is a structural view of a liquid crystal display device according to an embodiment of the invention, which is a plan view of the first embodiment in IPS mode.
Figure 16B:
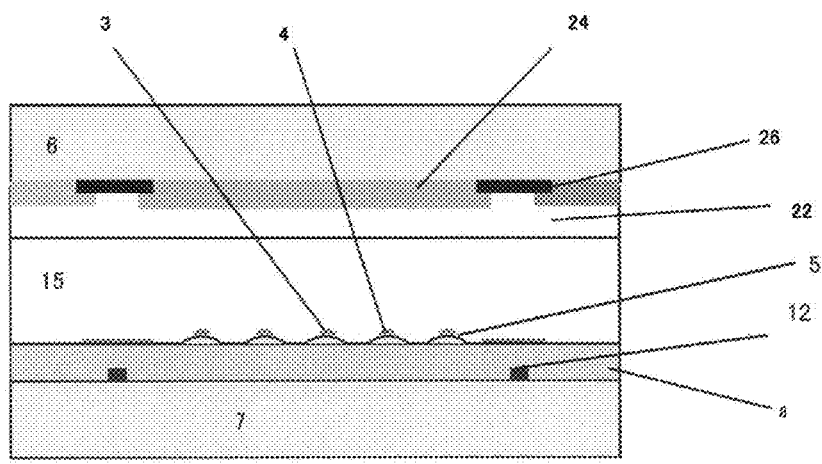
FIG. 16B is the structural view of the liquid crystal display device according to the an embodiment of the invention, which is an A-A cross-sectional view of the first embodiment in IPS mode.

FIG. 16A is a plan view of a horizontal electric field-driven type liquid crystal display device of in-plane switching (IPS) mode according to an embodiment of the present invention, and FIG. 16B is a cross-sectional view thereof.

In a pixel region surrounded by signal lines 12 for applying a signal voltage to a plurality of pixel electrodes 3 and scanning lines 18, there are provided a pixel electrode substrate 7 including the plurality of pixel electrodes 3 arranged in a comb-like shape and connected to a switching element 20 and one of the signal lines 12 via the switching element 20 and a contact hole 21, a plurality of counter electrodes 4 each arranged in parallel to an extension direction of each of the pixel electrodes 3 to generate an electric field between the counter electrode 4 and each pixel electrode 3, a common line 28 for supplying a potential to the counter electrodes 4, and a plurality of isolated convex portions 5 of an embodiment of the present invention; a counter substrate 6 provided in a position facing the pixel electrode substrate 7 and including a color filter 24, a black matrix 26, and an overcoat 22; and a liquid crystal 15 filled between the pixel electrode substrate 7 and the counter substrate 6, thereby forming a pixel. The isolated convex portions 5 are provided at a layer that contacts with a liquid crystal layer of the pixel electrode substrate 7 via an alignment film (not depicted in the drawings).

A predetermined voltage is applied to the pixel electrodes 3 via the switching element 20 by applying the predetermined voltage to the signal line 12 to apply the voltage for driving the switching element 20 to the scanning line 18.

Then, a voltage for turning off the switching element 20 is applied to the scanning line 18 to maintain the predetermined voltage applied to the pixel electrodes 3.

When a potential difference occurs between each pixel electrode 3 and each counter electrode 4, an electric field occurs in a perpendicular direction in substantially the same plane as an extension direction of the pixel electrode 3 and the counter electrode 4.

Liquid crystal molecules are rotated in a direction in which the electric field direction is parallel to a long axis of the molecules, as a result of which birefringence occurs, thereby allowing control of transmittance in the pixel.

Figure 1A:
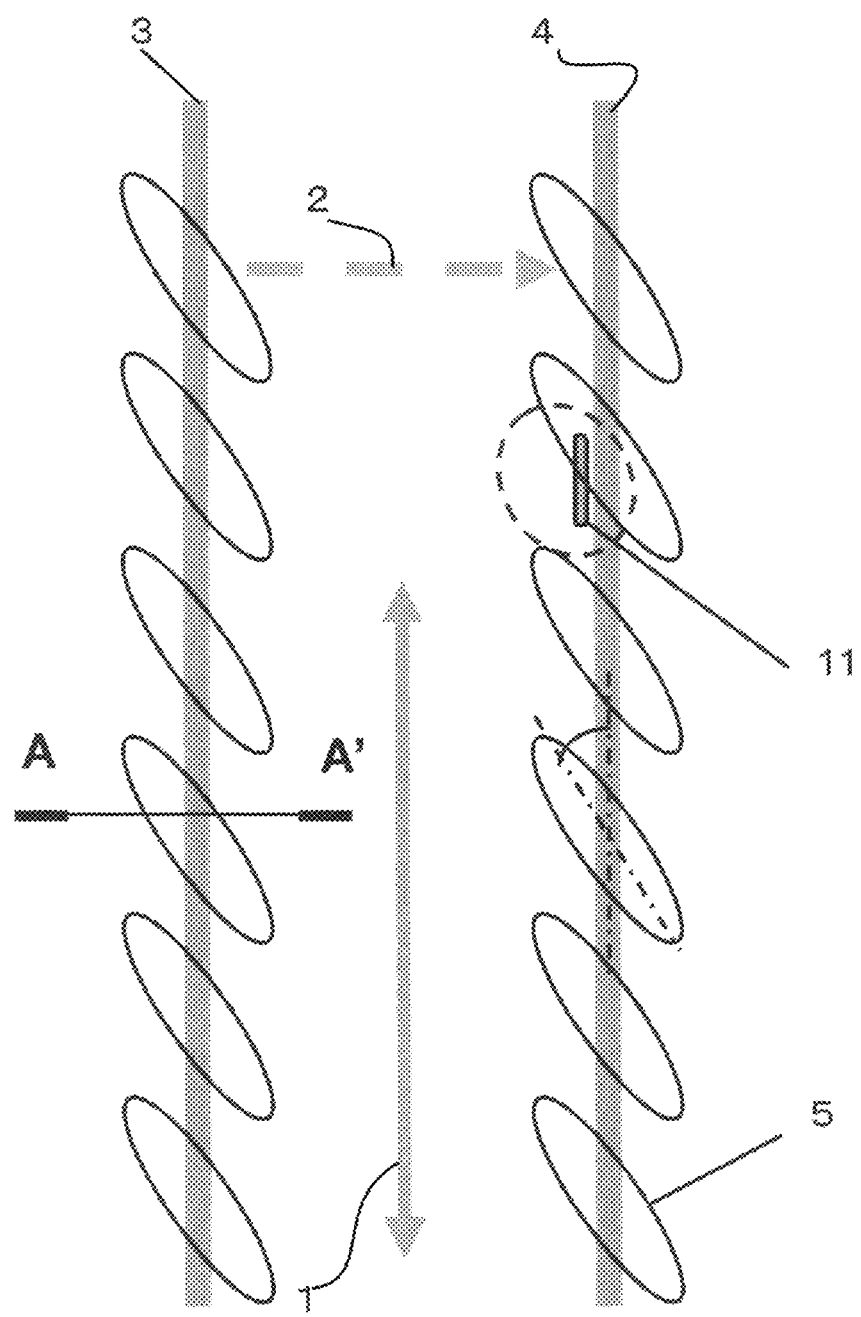
FIG. 1A is an illustrative view depicting a relationship between a direction of a liquid crystal molecule, an initial alignment direction, a longitudinal direction of an isolated convex portion of an embodiment according to the present invention, and an electric field direction in a structure according to an embodiment of the invention.

FIG. 1A is an illustrative view depicting a relationship between a direction of a liquid crystal molecule, an initial alignment direction, a longitudinal direction of an isolated convex portion of an embodiment of the present invention, and an electric field direction in a structure of an embodiment according to the present invention.

Figure 1B:
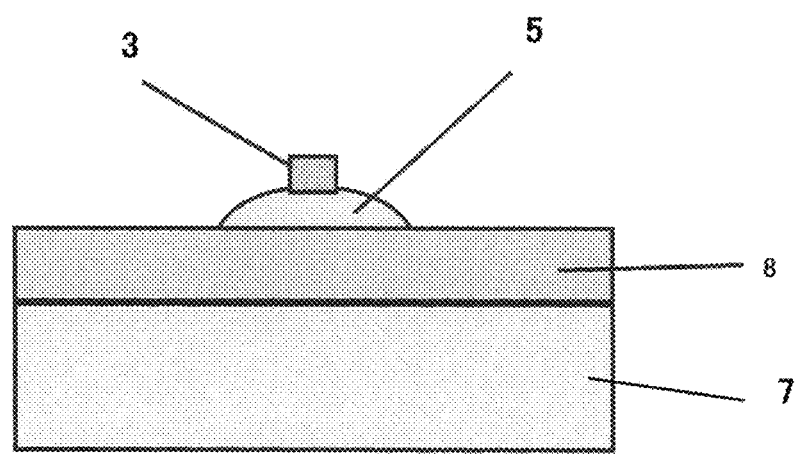
FIG. 1B is a cross-sectional view depicting a vicinity of a pixel electrode of an element of the FIG. 1A in the an embodiment of the invention.

FIG. 1B is an A-A' cross-sectional view depicting a vicinity of a pixel electrode of an element depicted in FIG. 1A.

Figure 2A:
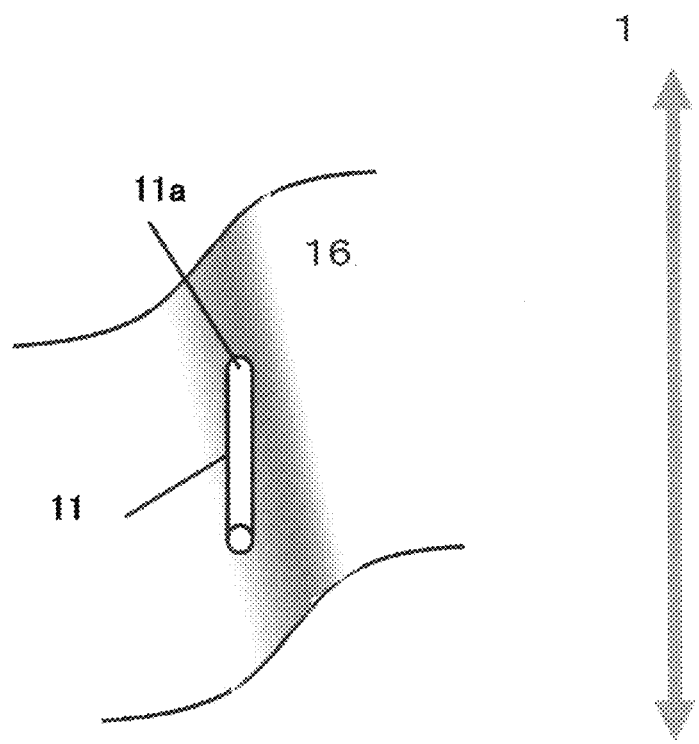
FIG. 2A is an illustrative view depicting a state of a liquid crystal molecule on an inclined part of the isolated convex portion of the embodiment of FIG. 1A in a liquid crystal display device according to an embodiment of the invention.
Figure 2B:
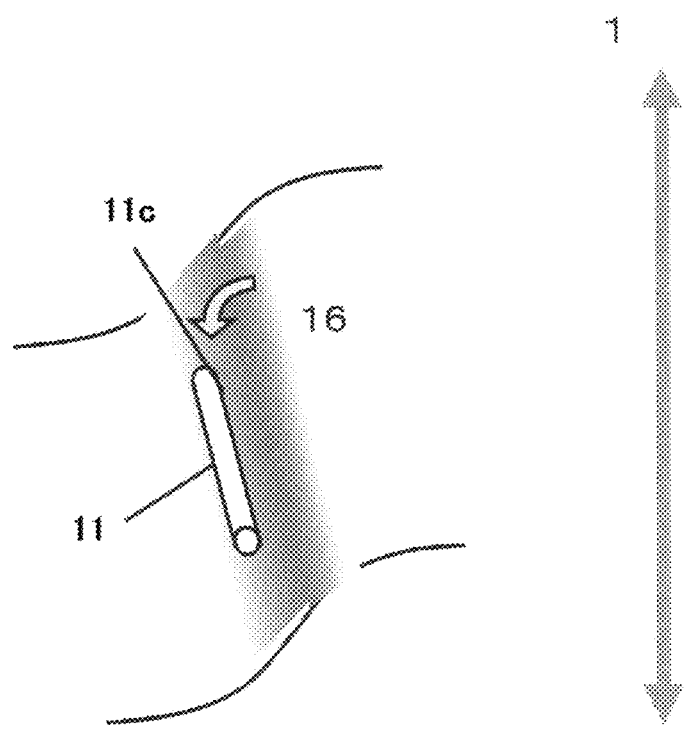
FIG. 2B is an illustrative view depicting a state of the liquid crystal molecule on the inclined part of the isolated convex portion of the embodiment of FIG. 1A in the liquid crystal display device according to the an embodiment of the invention.
Figure 2C:
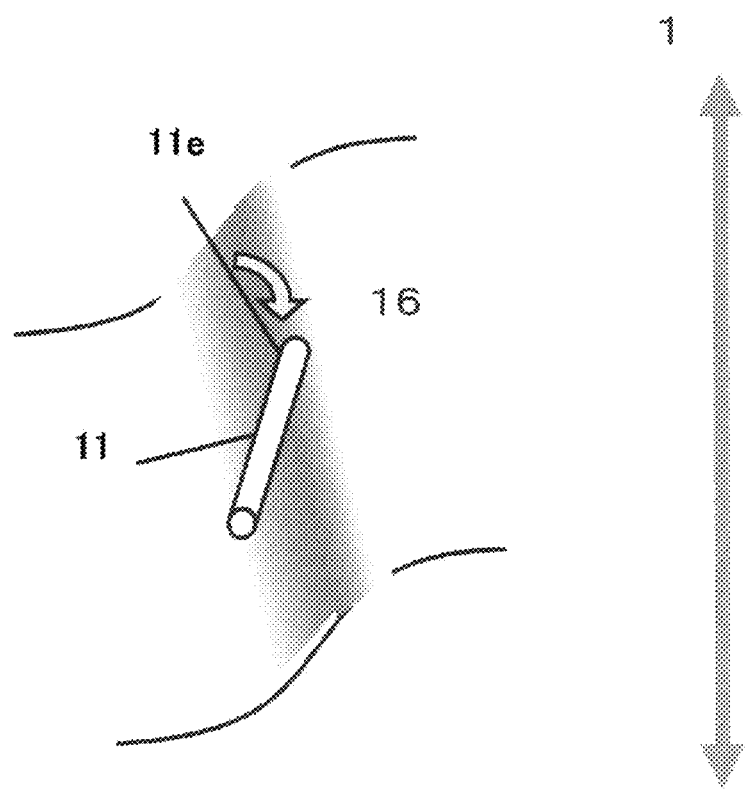
FIG. 2C is an illustrative view depicting a state of the liquid crystal molecule on the inclined part of the isolated convex portion of the embodiment of FIG. 1A in the liquid crystal display device according to the an embodiment of the invention.

FIGS. 2A, 2B, and 2C are illustrative views depicting states of a liquid crystal molecule on an inclined part of the isolated convex portion of the embodiment in FIG. 1A.

Figure 3A:
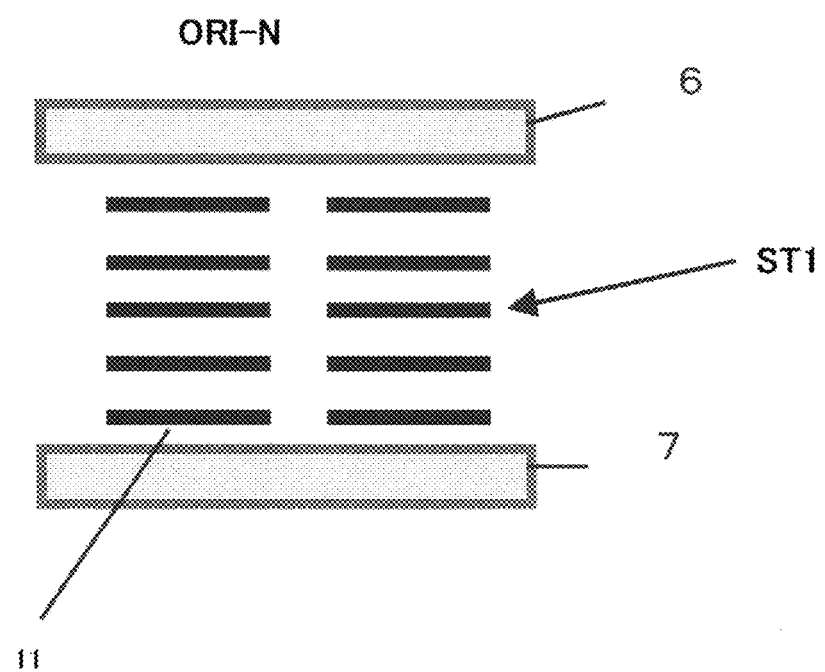
FIG. 3A is an illustrative view for illustrating splay alignment, which is a structural view of a normal alignment.
Figure 3B:
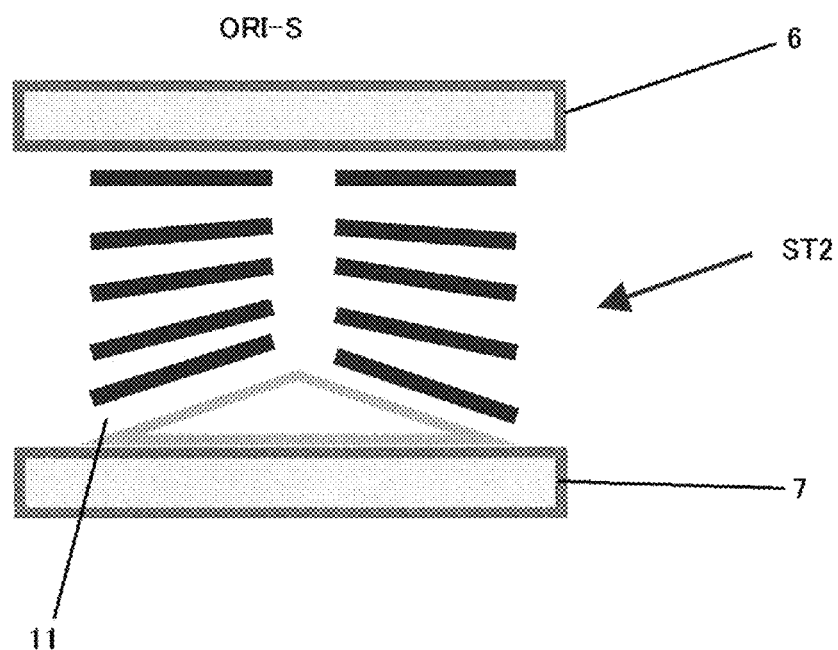
FIG. 3B is an illustrative view for illustrating splay alignment, which is a structural view of a splay alignment.

FIGS. 3A and 3B are illustrative views for illustrating splay alignment.

As depicted in FIG. 1A, an initial alignment direction 1 of the liquid crystal molecule is substantially parallel to the extension direction of the pixel electrode 3 and the counter electrode 4, and a plurality of isolated convex portions 5 each having a long and narrow shape and having a gentle inclination are arranged near the pixel electrode 3 and the counter electrode 4 in such a manner that a longitudinal direction of each of the isolated convex portions 5 forms an oblique angle with respect to the pixel electrode 3 and the counter electrode 4.

Figure 17:
FIG. 17 is an illustrative view depicting a liquid crystal display device according to an embodiment of the invention, which is an illustrative view depicting a manufacturing method for forming a convex portion by using a photolithographic technique.
Figure 17:
Figure 17:
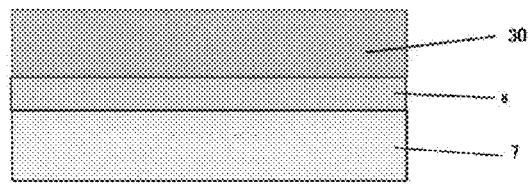
Figure 17:
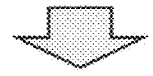
Figure 17:
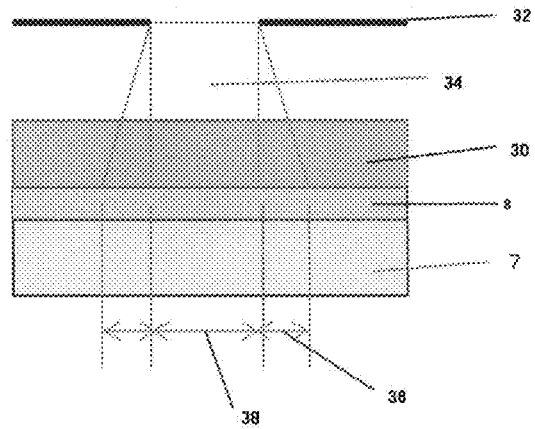
Figure 17:
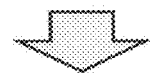
Figure 17:
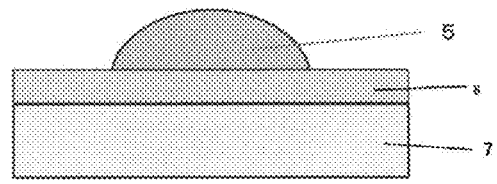

For example, as depicted in FIG. 17, the above long and narrow isolated convex portion 5 can be provided by forming a coating film made of a photosensitive acrylic material on an insulation film 8 using a photolithographic technique or the like.

An acrylic resin 30 having negative photosensitivity or the like is applied on the pixel electrode substrate 7 and exposed to light by a photolithographic technique to form into a desired shape by using a proximity exposure system.

With appropriate adjustment of an optical system of an exposure device 34, a blurred image of a pattern on a photomask 32 is projected on the pixel electrode substrate 7, whereby there occur a region irradiated with a large amount of irradiation light (a 100% exposure region: 38) and a region irradiated with a small amount of irradiation light (an intermediate exposure region: 36).

Next, when a non-photosensitive region is removed at a development step, residual film thickness in the region irradiated with the small amount of irradiation light changes according to the amount of light, whereby there can be obtained a convex portion having an inclination (the isolated convex portion 5).

Alternatively, a technique for partially reducing an amount of exposure of light may be utilized using a photomask called half-tone mask.

While the above description has been given of the example of the negative photosensitivity, a resin material having positive photosensitivity may be used.

Figure 18:
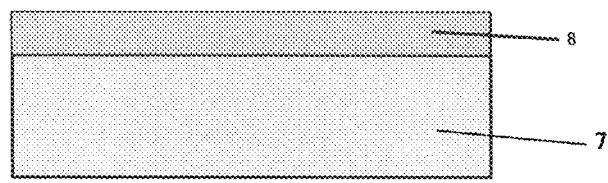
FIG. 18 is an illustrative view depicting a liquid crystal display device according to an embodiment of the invention, which is an illustrative view of a manufacturing method for forming a convex portion by melting resin after photolithography.
Figure 18:
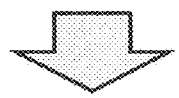
Figure 18:
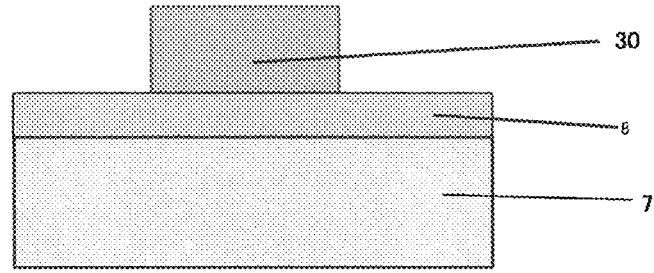
Figure 18:
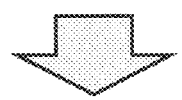
Figure 18:
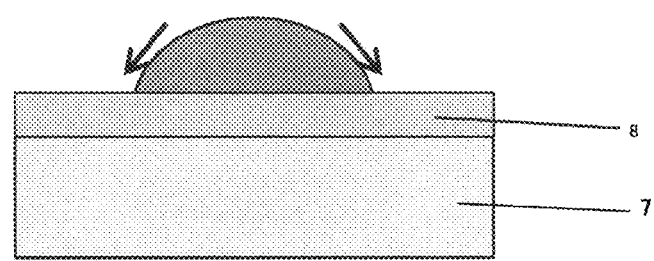

In addition, as depicted in FIG. 18, after forming a structure having a uniform film thickness by formation of a pattern using photolithography with the photosensitive acrylic resin 30, a surrounding part of the structure may be melted with a solvent to make the part gently inclined, or the resin or the like forming the structure may be heated up to a temperature no less than a softening point or a melting point of the resin to liquidize the resin and then a surface tension of the liquidized resin may be utilized to form a convex portion having a gentle inclination.

As described above, although there are many materials and methods for forming the isolated convex portion of the embodiment, the invention does not limit the material and method therefor.

Figure 20:
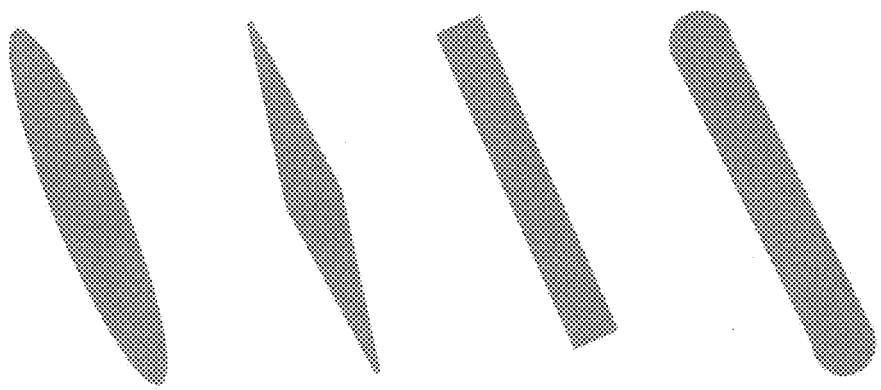
FIG. 20 is an illustrative view depicting a liquid crystal display device according to an embodiment of the invention, which is a view depicting several examples of the convex portion.

In addition, as depicted in FIG. 20, the shape of the isolated convex portion 5 can be any shape, such as a rectangle, oval, or rhombus. In the present invention, the shape of the isolated convex portion 5 is not limited to any of the above shapes, as long as the portion has a planar shape including a short axis direction and a long axis direction (referred to as "long and narrow") and has a gentle inclination formed thereon.

In the present embodiment, a longitudinal direction of a structure having the above long and narrow convex shape is arranged at an oblique angle with respect to the initial alignment direction 1 of the liquid crystal molecules whose direction has been determined by rubbing treatment, optical alignment treatment, or the like.

With the above arrangement, an initial alignment state of the liquid crystal is a state, as depicted in FIG. 2A, where a liquid crystal molecule 11 located near a surface of the inclined part of a peripheral edge of the convex portion is slightly standing up at an angle influenced by the inclined part of the isolated convex portion 5 with respect to a planar direction of the substrate.

Regarding the liquid crystal molecule 11 located on the inclined part of the isolated convex portion 5 on the pixel surface, a manner of standing up (a pre-tilt angle) of the molecule 11 in a direction perpendicular with respect to the planar direction of the pixel electrode substrate 7 varies depending on an angle formed by the long axis direction of the liquid crystal molecule 11 and a contour line of inclination of the inclined part.

In other words, as depicted in FIG. 2B, the liquid crystal molecule 11 that has rotated in a direction in which the long axis direction of the liquid crystal molecule 11 is parallel to a direction of the contour line of the inclined part does not stand up with respect to the planar direction of the pixel electrode substrate 7, and thus the pre-tilt angle is small. Conversely, as depicted in FIG. 2C, the liquid crystal molecule 11 that has rotated in a direction in which the angle formed by the long axis direction of the liquid crystal molecule 11 and the contour line of the inclined part is large stands up with respect to the pixel electrode substrate 7, and thus the pre-tilt angle is large.

As depicted in FIG. 3A, liquid crystal molecules 11 that are normally located near a substrate surface of the counter substrate 6 side are aligned in a direction substantially parallel to the counter substrate and therefore are in a state where there is almost no pre-tile angle (ORI-N).

On the other hand, when liquid crystal molecules 11 that are located near the pixel electrode substrate 7 side with concave and convex parts stand up as depicted in FIG. 3B, the angle of the liquid crystal molecules 11 formed with respect to the liquid crystal molecules 11 located near the counter substrate is not parallel and therefore the state of the molecules becomes a state called "splay alignment" (ORI-S). In this state, the liquid crystal molecules 11 are aligned while mutually extending at an angle in a direction perpendicular to the substrate.

In the state of splay alignment, an elastic force of liquid crystal itself acts as compared to the state of parallel alignment, so that a high-energy state occurs.

The pixel electrode 3 and the counter electrode 4 may be either upper layers or lower layers than the isolated convex portions 5.

In addition, the isolated convex portions 5 may be arranged in a position overlapping with the electrodes or arranged in a position between the electrodes.

Additionally, the isolated convex portions 5 do not necessarily have to be directly provided at a layer contacted with a liquid crystal layer of the pixel electrode substrate 7 via an alignment film (not depicted in the drawing). The insulation film 8 of an uppermost layer contacted with the liquid crystal layer of the pixel electrode substrate 7 may be additionally provided on the isolated convex portions 5, and then the insulation film 8 of the uppermost layer may have a convex shape.

Next, a description will be given of functions and advantageous effects provided by the present invention, with reference to FIGS. 2A, 2B, 2C, 9, 10, and 11.

Figure 9:
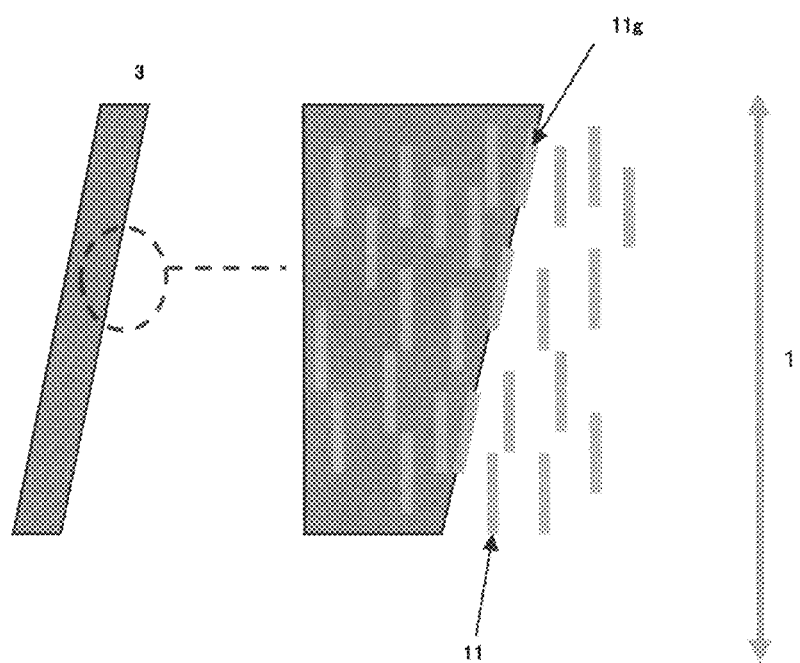
FIG. 9 is an illustrative view depicting a disorder in an initial alignment state of liquid crystal on a side wall portion of a conventional pixel electrode.
Figure 10:
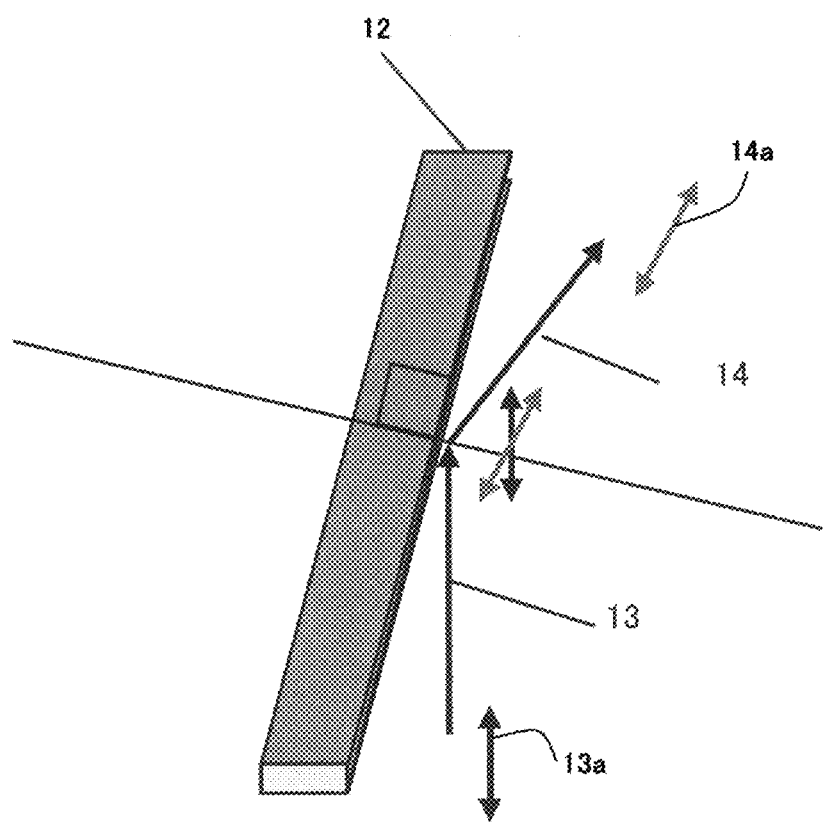
FIG. 10 is an illustrative view depicting a polarization state of reflected light when linearly polarized light is input to and reflected by a conventional wire metal side wall portion.
Figure 11:
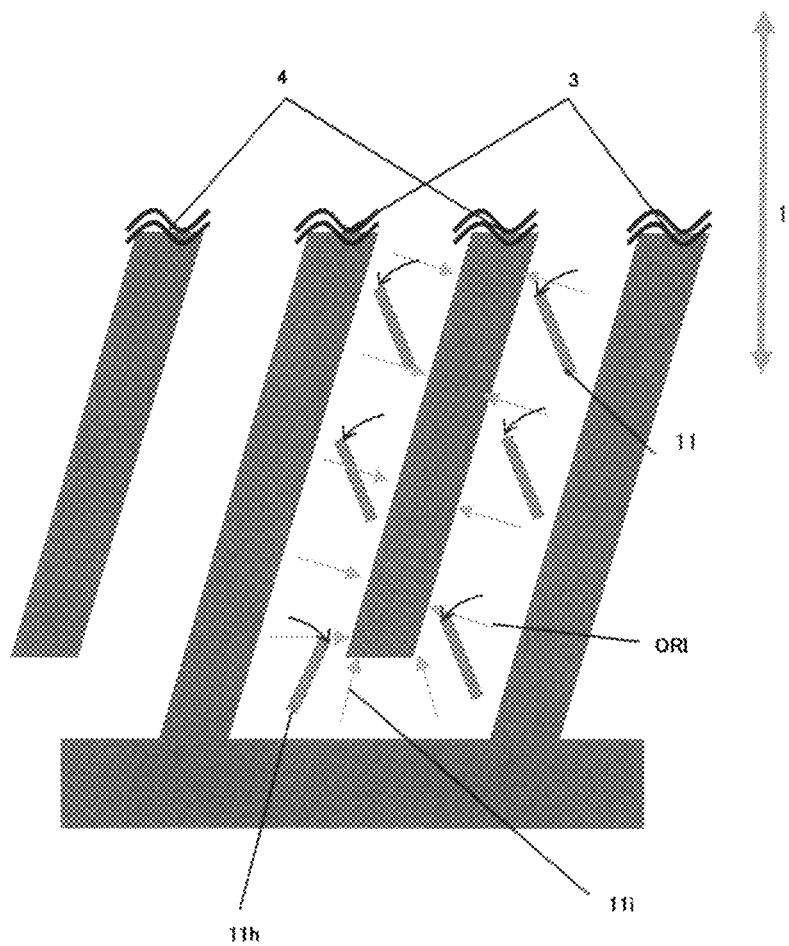
FIG. 11 is an illustrative view depicting a direction of an electric field and a rotation direction of a liquid crystal molecule in a vicinity of an end part of a conventional pixel electrode.

FIG. 9 is an illustrative view depicting a disorder in an initial alignment state on a side wall portion of a pixel electrode of a conventional art; FIG. 10 is an illustrative view depicting a polarization state of reflected light when linearly polarized light is input to a wire metal side wall portion; and FIG. 11 is an illustrative view depicting a direction of an electric field and a rotation direction of a liquid crystal molecule in a vicinity of an end part of the pixel electrode.

In the present embodiment, as depicted in FIGS. 2A, 2B, and 2C, a longitudinal direction of the isolated convex portion 5 having a long and narrow shape and having a gentle inclination is arranged at an oblique angle with respect to the initial alignment direction 1 of the liquid crystal. Accordingly, the liquid crystal facing the inclined part has a direction with a large pre-tilt angle and a direction with a small pre-tilt angle depending on the rotation direction thereof. In FIG. 2A, the liquid crystal molecules 11 are in a non-rotation state where one end 11a thereof is being slightly lifted up.

As depicted in FIG. 2C, the state where the liquid crystal molecule is rotated in the direction in which the pre-tilt angle of the liquid crystal is large is a high-energy and unstable state. In this state, as indicated by one end 11e, the liquid crystal molecule 11 is further lifted up, and a pre-tilt angle in a vertical direction is formed.

In contrast, as depicted in FIG. 2B, the state where the liquid crystal molecule is rotated in the direction in which the pre-tilt angle is small is a low-energy and stable state. Accordingly, even when a rotation torque that is substantially the same on the right and left sides is applied to the liquid crystal molecule by an electric field, the liquid crystal molecule easily rotates in the rotation direction of FIG. 2B where the liquid crystal molecule is in the more stable state. In this case, as indicated by one end 11c, the liquid crystal molecule becomes close to a horizontal direction.

With the above arrangement, even when an angle formed by the initial alignment direction 1 and an electric field direction 2 that is a direction perpendicular to the extension direction of the pixel electrode 3 and the counter electrode 4 is perpendicular, the rotation direction of the liquid crystal can be specified.

Since it is unnecessary to form an angle between the initial alignment direction 1 and the extension direction of each of the electrodes 3 and 4, i.e., the initial alignment direction 1 and the extension direction of each of the electrodes 3 and 4 can be arranged in parallel to each other. Thus, it is unnecessary to perform rubbing and optical alignment treatment obliquely on a stepped part of a side wall portion of each of the electrodes.

When the side wall portion of each of the electrodes is obliquely subjected to alignment treatment, there occurs a phenomenon in which the liquid crystal molecules 11 are aligned in a direction of the electrode side wall stepped portion, as depicted in FIG. 9, and an alignment direction in the initial alignment state is partially disordered.

In addition, as depicted in FIG. 10, when incident light 13 emitted from a backlight light source impinges obliquely to a side surface of a wire metal and then is reflected thereby, there occurs a phenomenon in which a linear polarization direction of reflected light 14 changes. However, as in the present embodiment, the initial alignment direction becomes parallel to the side walls of each electrode and the wire metal, so that the above negative influence can be suppressed and there is an advantageous effect in that light leakage in black display is reduced.

Additionally, in the conventional art, as depicted in FIG. 11, since the direction of an electric field is disordered at an electrode end part, an electric field direction opposite to a desired direction is easily generated. As a result, there has been a problem in that opposite rotation of liquid crystal molecules occurs.

Due to that, particularly at the electrode end part, the electric field direction has been stabilized by a technique such as bending the extension direction of the electrode or superimposing an auxiliary electrode made as another layer. This has made the structure complicated, thereby causing problems with reduction in aperture ratio and increase in defect incidence rate. On the other hand, arranging the convex structure of the an embodiment according to the present invention at an end part of the electrode allows stabilization of the rotation direction of liquid crystal molecules. Thus, opposite rotation of the liquid crystal molecules can be prevented without using the specific techniques as mentioned above, so that reduction in aperture ratio and the like can be suppressed.

In addition, with the use of the structure of the embodiment, even when an opposite rotation region is partially generated for some reason, the rotation easily turns back to a forward rotation, so that problems due to disclination are less likely to occur.

Additionally, in the present embodiment, since the angle formed by the initial alignment direction 1 and the electric field direction 2 can be made substantially perpendicular, a torque for rotating the liquid crystal efficiently acts, so that there is an advantageous effect in that a predetermined liquid crystal rotation angle can be achieved by applying low voltage.

Second Embodiment

A second embodiment as another embodiment of the present invention will be described with reference to FIG. 5.

Figure 5:
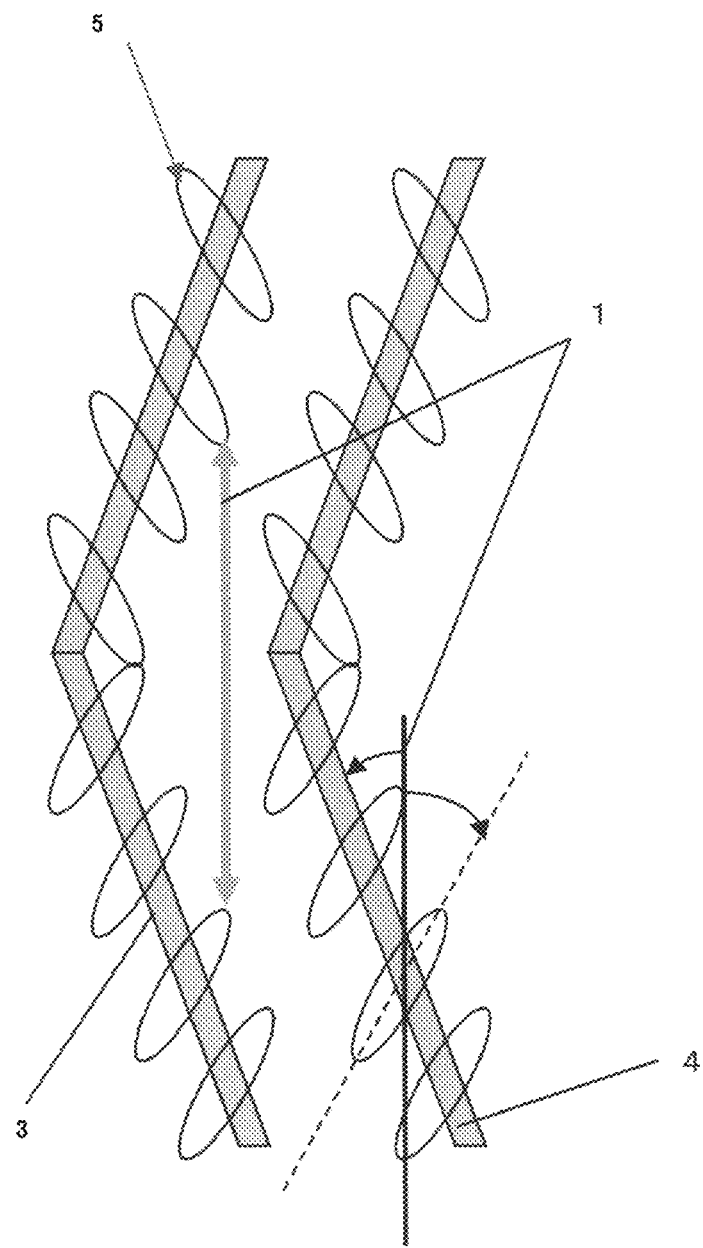
FIG. 5 is a structural view of a liquid crystal display device according to a second embodiment of the invention.

FIG. 5 is an illustrative view depicting an embodiment of a pixel structure called multi-domain structure.

In the present embodiment, in an arrangement including the initial alignment direction 1 of liquid crystal molecules that is the same direction as an alignment treatment direction, and the pixel electrode 3 and the counter electrode 4 extended obliquely with respect to the initial alignment direction 1, there are provided a plurality of isolated convex portions 5 that has a long and narrow shape and a gentle inclination near the pixel electrode 3 and the counter electrode 4, in which a longitudinal direction of the isolated convex portions 5 has an arbitrary oblique angle in a direction opposite to an angle formed by an extension direction the pixel electrode 3 and the counter electrode 4 with respect to the initial alignment direction 1 of the liquid crystal molecules, on the basis of the initial alignment direction 1.

Herein, the pixel electrode 3 and the counter electrode 4 may be provided as upper layers of the isolated convex portion 5 (on a liquid crystal surface side) or as lower layers thereof (on a pixel electrode substrate side).

In the above arrangement, the pixel electrode 3 and the counter electrode 4 are arranged angularly with respect to the initial alignment direction 1. Thus, the direction of an electric field applied to the liquid crystal molecules has an oblique angle with respect to the initial alignment direction 1, whereby a torque for rotating the liquid crystal molecules becomes large in a desired rotation direction. Accordingly, the liquid crystal molecules easily rotate in the desired rotation direction. Furthermore, as in the first embodiment, when the liquid crystal molecules rotate in the desired rotation direction, the liquid crystal molecules are aligned in parallel to a contour line of the isolated convex portions 5 based on a glass substrate surface, as a result of which elastic energy of the liquid crystal becomes low.

In this manner, electrically and structurally restricting the direction in which the liquid crystal molecules are easily rotated provides an advantageous effect in that the problem of opposite rotation is even less likely to occur.

Third Embodiment

A third embodiment as another embodiment of the present invention will be described with reference to FIG. 14.

Figure 14:
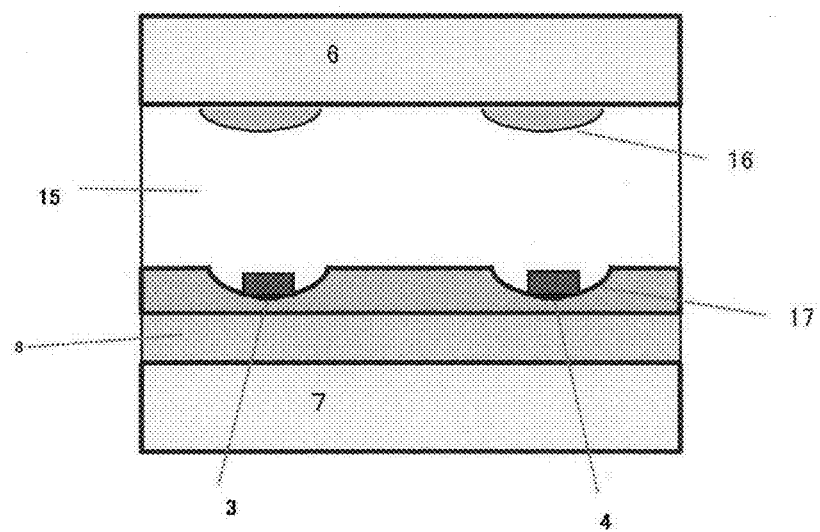
FIG. 14 is a structural view of a liquid crystal display device according to a third embodiment and a sixth embodiment of the invention, which is a cross-sectional view of an example in which concave portions are provided instead of the convex portions.

FIG. 14 is a cross-sectional view of an example in which the convex portion of FIGS. 1 and 5 has been replaced by a concave portion 17.

The above-mentioned advantageous effect of the invention is obtained when the contour line of the inclined part of the structure forms an oblique angle with respect to the initial alignment direction 1 and the long axis direction of the liquid crystal molecules is parallel to the contour line when the liquid crystal molecules are rotated in a desired rotation direction. Thus, the same advantageous effect can be obtained regardless of whether the shape of the structure is convex or concave.

Even in the present embodiment, the concave portion can be formed by leaving a film of a remaining part other than the concave portion by a photosensitive resin or the like to remove the resin of the concave portion by development or the like, as in the formation of the convex portion.

Figure 19:
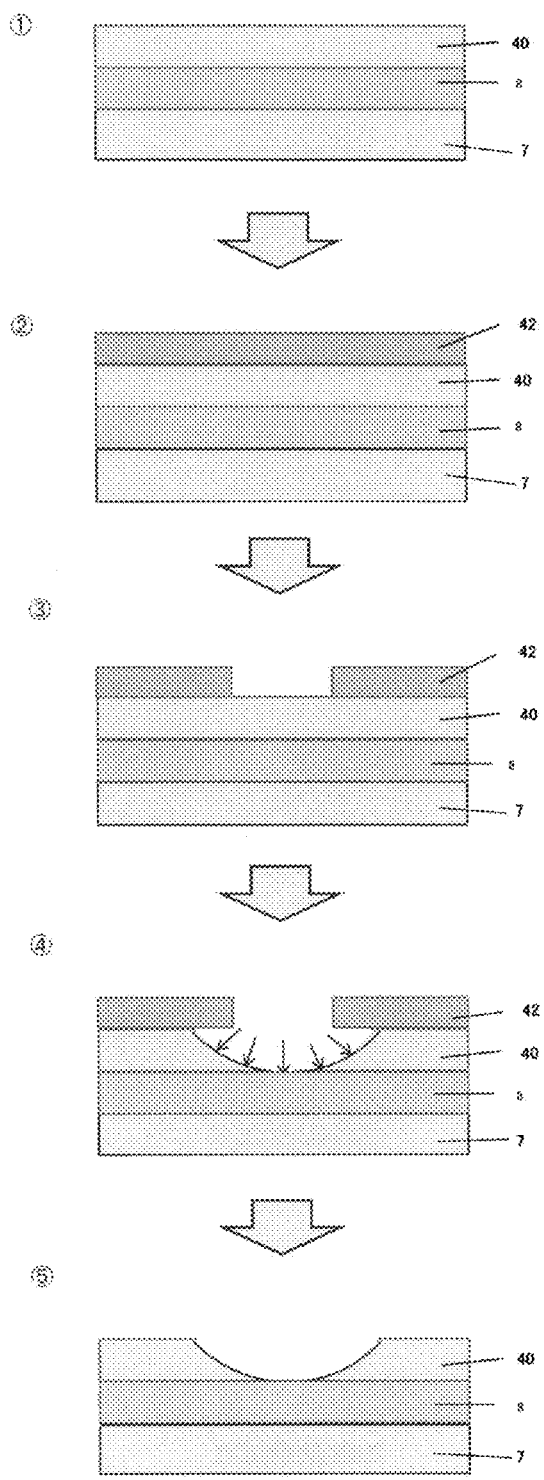
FIG. 19 is an illustrative view of a liquid crystal display device according to an embodiment of the invention, which is an illustrative view of a manufacturing method for forming a concave portion by photolithography and isotropic etching.

Additionally, for example, as depicted in FIG. 19, a film of a non-photosensitive material, for example, a silicon nitride film or the like that is an inorganic insulation film 40, is formed and a photoresist film 42 is applied thereon. Then, the photoresist film is patterned into a predetermined shape by a photolithographic technique, and then, a predetermined portion of the non-photosensitive material is dug into by isotropic etching, whereby a concave portion can be formed.

In the above technique, the structure does not need photosensitivity, and therefore, there is an advantage in that material selection can be made relatively freely.

Fourth Embodiment

A fourth embodiment as another embodiment of the invention will be described with reference to FIGS. 4A, 4B, and 6.

Figure 4A:
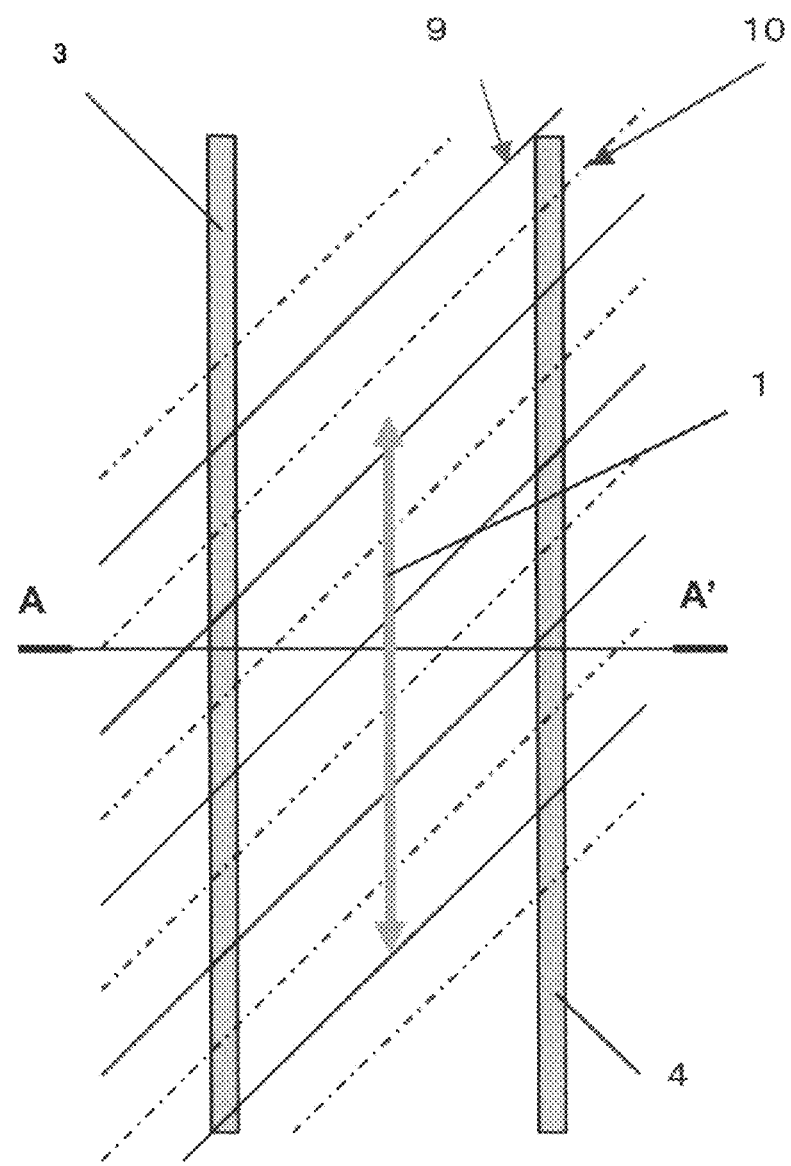
FIG. 4A is a structural view of a liquid crystal display device according to a fourth embodiment of the invention.
Figure 4B:
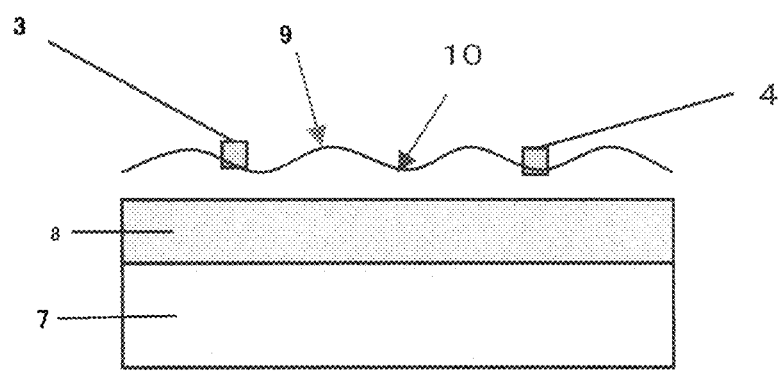
FIG. 4B is an A-A cross-sectional view of a structural view of the liquid crystal display device according to the fourth embodiment of the invention.
Figure 6:
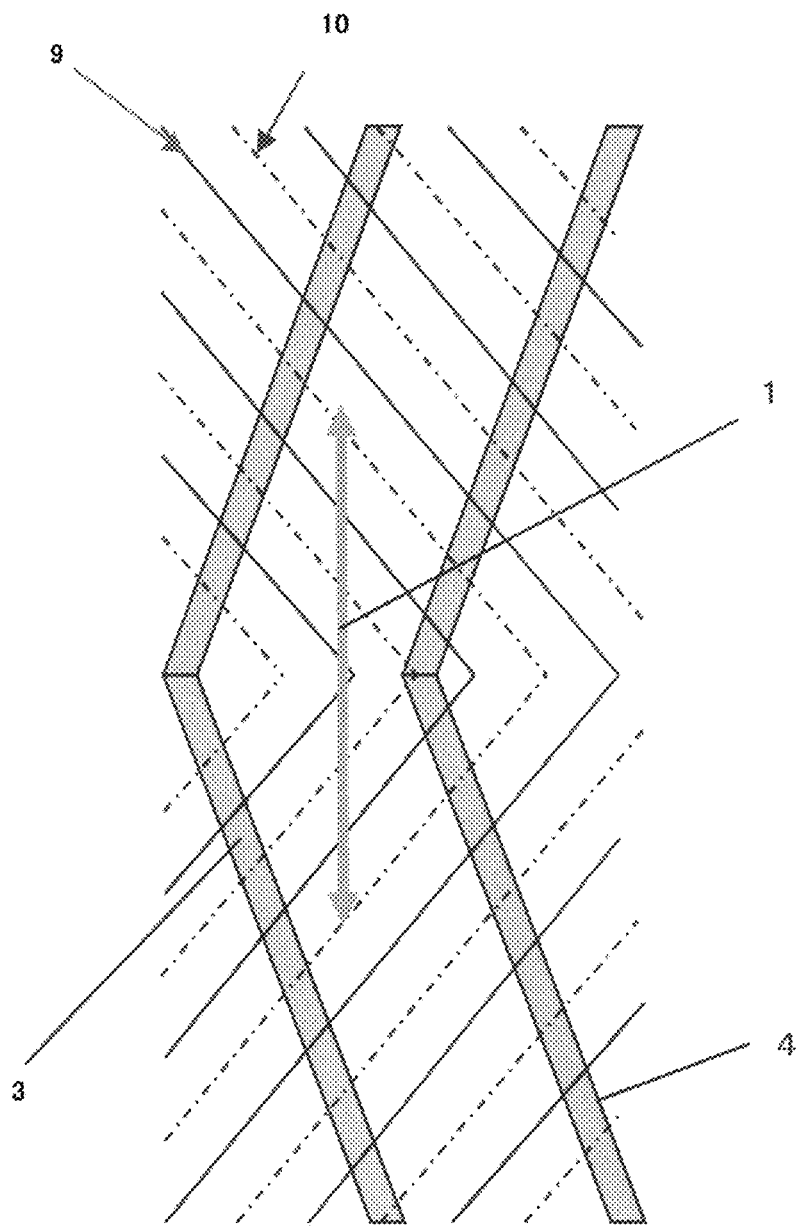
FIG. 6 is the structural view of the liquid crystal display device according to the fourth embodiment of the invention.
Figure 7:
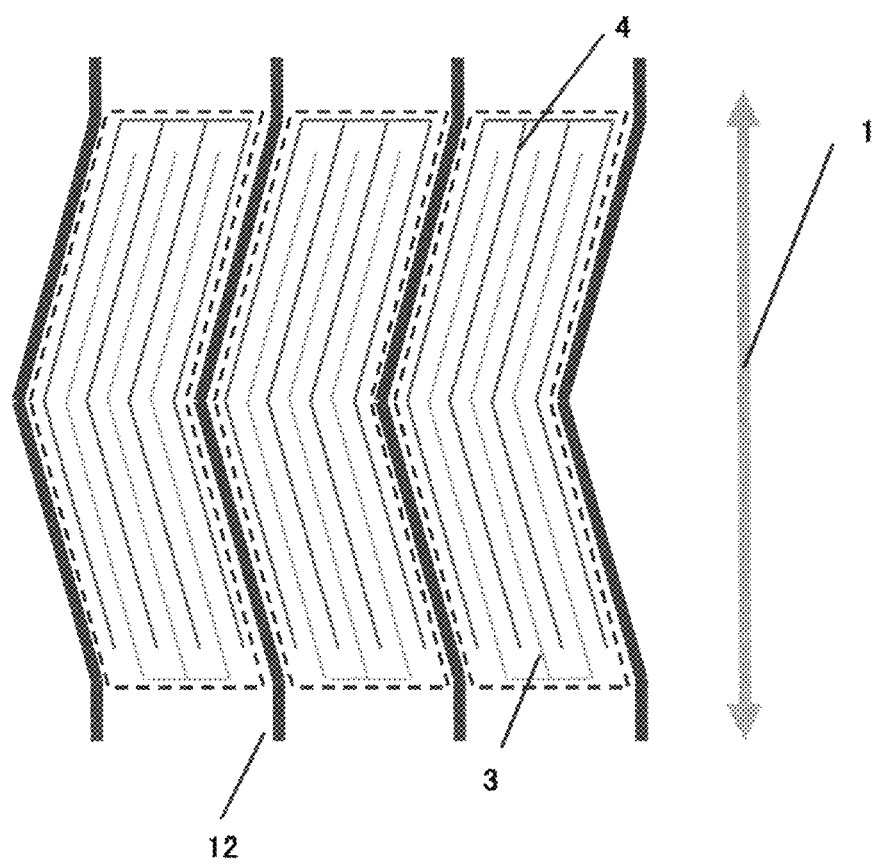
FIG. 7 is an example of a pixel structure of a conventional ordinary horizontal electric field type liquid crystal element.
Figure 8:
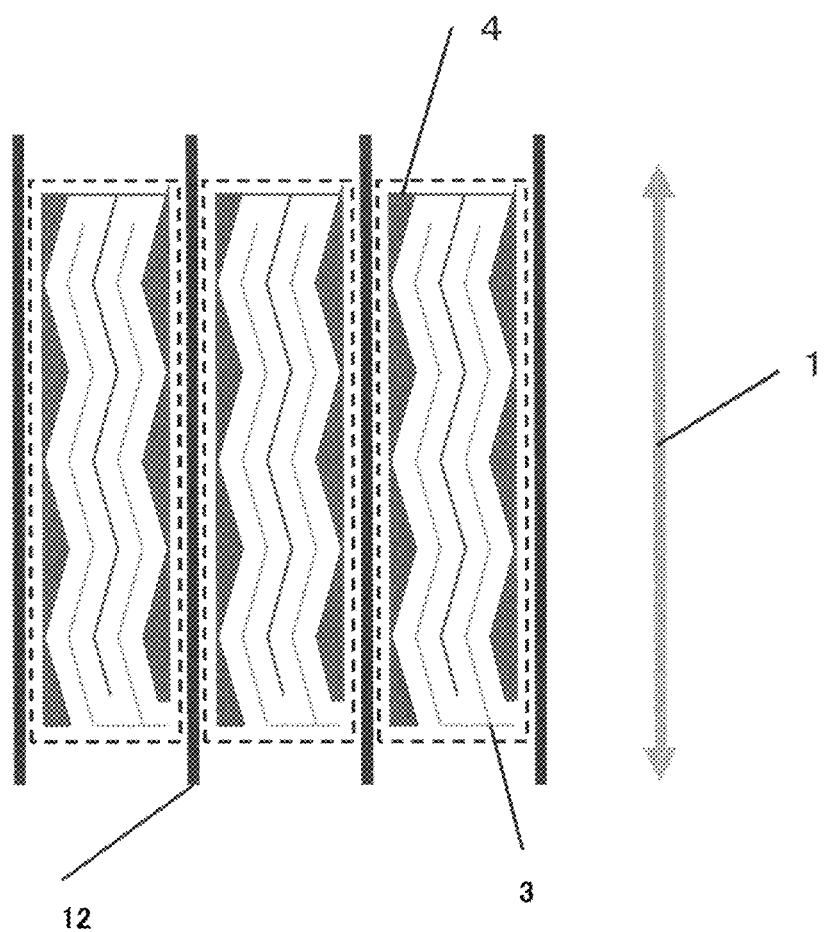
FIG. 8 is another example of a pixel structure of a conventional ordinary horizontal electric field type liquid crystal element.

FIGS. 4A and 4B are illustrative views depicting a structure in which the present embodiment has been applied to the first embodiment, and FIG. 6 is an illustrative view depicting a structure in which the present embodiment has been applied to the second embodiment.

In the present embodiment, in an arrangement including the initial alignment direction 1 of liquid crystal molecules that is the same direction as an alignment treatment direction, and the pixel electrode 3 and the counter electrode 4 extended in parallel to the initial alignment direction 1 of the liquid crystal molecules, there are provided linear convex and concave portions 9 and 10 each having a gentle inclination with such an arbitrary oblique angle that they become close in parallel to the long axis direction of the liquid crystal molecules when the liquid crystal molecules are rotated in a desired liquid crystal molecule rotation direction with respect to the initial alignment direction 1 of the liquid crystal molecules.

The linear convex and concave portions 9 and 10 are provided in the vicinity of the pixel electrode 3, in the vicinity of the counter electrode 4, and also in a pixel aperture region between the pixel electrode 3 and the counter electrode 4 in such a manner as to connect them continuously.

In the present embodiment, when the liquid crystal molecules are rotated in the desired rotation direction, the elastic energy of the liquid crystal is reduced even in the pixel aperture region between the pixel electrode 3 and the counter electrode 4, as in the vicinities of the pixel electrode 3 and the counter electrode 4. Thus, opposite rotation of the liquid crystal molecules is even less likely to occur.

In another embodiment of the present embodiment, as in the second embodiment, in the arrangement including the initial alignment direction 1 of the liquid crystal molecules that is the same direction as an alignment treatment direction, and the pixel electrode 3 and the counter electrode 4 extended obliquely with respect to the initial alignment direction 1 thereof, there are provided linear convex and concave portions 9 and 10 having a gentle inclination with an arbitrary oblique angle in a direction opposite to an angle formed by the extension direction of the pixel electrode 3 and the counter electrode 4 with respect to the initial alignment direction of the liquid crystal molecules, on the basis of the initial alignment direction 1 thereof.

The linear convex and concave portions 9 and 10 are provided in the vicinity of the pixel electrode 3, in the vicinity of the counter electrode 4, and also in a pixel aperture region between the pixel electrode 3 and the counter electrode 4 in such a manner as to connect them continuously.

With the above arrangement, the pixel electrode 3 and the counter electrode 4 are arranged angularly with respect to the initial alignment direction 1. Thus, the direction of an electric field applied to the liquid crystal molecules has an oblique angle with respect to the initial alignment direction 1, whereby a torque for rotating the liquid crystal molecules becomes large in a desired rotation direction. Accordingly, the liquid crystal molecules are easily rotated in the desired rotation direction. Furthermore, when the liquid crystal molecules rotate in the desired rotation direction, the liquid crystal molecules are aligned in parallel to a contour line of the linear convex portion 9 based on a pixel electrode substrate surface, as a result of which elastic energy of the liquid crystal is reduced.

In addition, when the liquid crystal molecules are rotated in the desired rotation direction, the elastic energy of the liquid crystal is reduced even in the pixel aperture region between the pixel electrode 3 and the counter electrode 4, as in the vicinities of the pixel electrode 3 and the counter electrode 4. Thus, opposite rotation of the liquid crystal molecules is even less likely to occur.

Fifth Embodiment

A fifth embodiment as another embodiment of the present invention will be described with reference to FIG. 12. In a structure of the fifth embodiment, the structure of any of the first to the fourth embodiments is provided on the counter substrate side.

Figure 12:
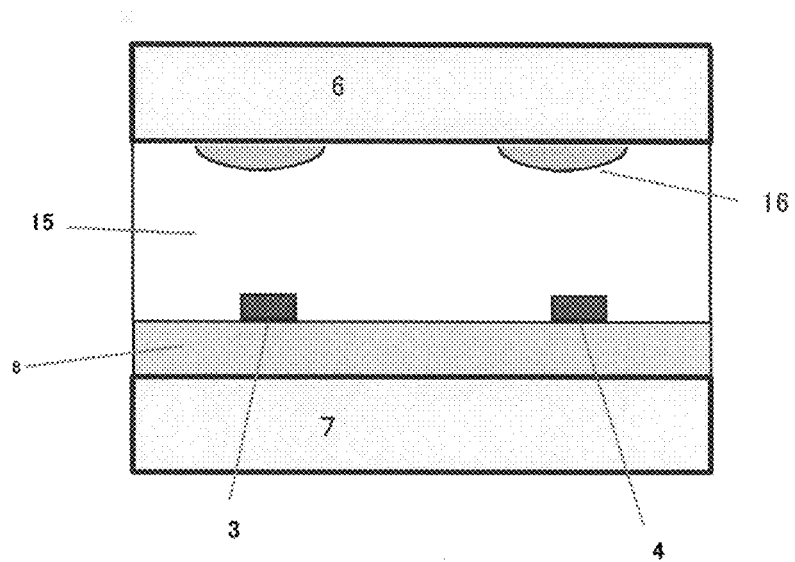
FIG. 12 is a structural view of a liquid crystal display according to a fifth embodiment of the invention, which is a cross-sectional view of an example in which convex portions are provided on a counter substrate side.

FIG. 12 is a cross-sectional view of an example in which a plurality of convex portions are formed on the counter substrate side. Herein, the convex portions (isolated convex portions or linear convex portions) may be concave portions (isolated concave portions or linear concave portions).

The liquid crystal molecules are characterized by that they tend to rotate in the same direction in both of the vicinity of the pixel electrode substrate 7 and the vicinity of the counter substrate 6 positioned to face the pixel electrode substrate 7. Thus, even in the case of providing any of the structures of the first to the fourth embodiments on the counter substrate 6, by arranging the longitudinal direction of the convex portion or the extension direction of the concave portion in such a manner that when liquid crystal molecules in the vicinity of the counter substrate 6 are rotated in a desired rotation direction, the liquid crystal molecules are parallel to a contour line of an inclined part formed into the same shape as the inclined part of the first to the fourth embodiments on the counter substrate, elastic energy of the liquid crystal is reduced when the liquid crystal is rotated in the desired rotation direction. Thus, there can be obtained the same advantageous effect as that of the first to the fourth embodiments.

In addition, since any pixel electrode and the like are not arranged on the counter substrate, there is an advantageous effect in that the same shape as that of the first to the fourth embodiments can be relatively easily formed as compared to a case of providing the above structure on the pixel electrode substrate.

Sixth Embodiment

A sixth embodiment as another embodiment of the present invention will be described with reference to FIGS. 13 and 14.

Figure 13:
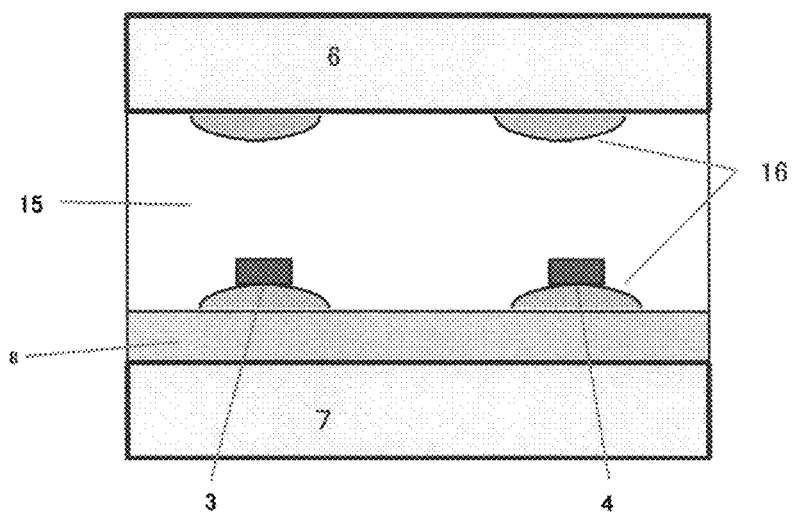
FIG. 13 is a structural view of the liquid crystal display according to the fifth embodiment of the invention, which is a cross-sectional view of an example in which convex portions are provided on both of the counter substrate side and a pixel electrode substrate side.

FIG. 13 is a cross-sectional view of an example in which a plurality of convex portions 16 are provided on both of the counter substrate and the pixel electrode substrate. Herein, the convex portions (isolated convex portions or linear convex portions) may be concave portions (recessed portions or linear concave portions).

Providing the same structure on the counter substrate 6 and the pixel electrode substrate 7 as in the present sixth embodiment allows splay elasticity to significantly acts in rotation of the liquid crystal molecules in a direction opposite to a desired liquid crystal rotation direction. Thus, the structure of the present embodiment is highly effective to prevent opposite rotation.

In addition, as depicted in FIG. 14, providing convex portions 16 on one of the substrates and the concave portions 17 on the other one thereof allows a thickness of the liquid crystal layer to be kept constant. This reduces influence of the concave and convex shape on optical characteristics, thereby facilitating optical design.

There is no limitation to combinations of the various structures in the present invention, such as a combination of the structure of the first embodiment arranged on the counter substrate side and the structure of the fourth embodiment arranged on the pixel electrode substrate side.

Seventh Embodiment

A seventh embodiment as anther embodiment of the present invention will be described with reference to FIGS. 15A and 15B.

Figure 15A:
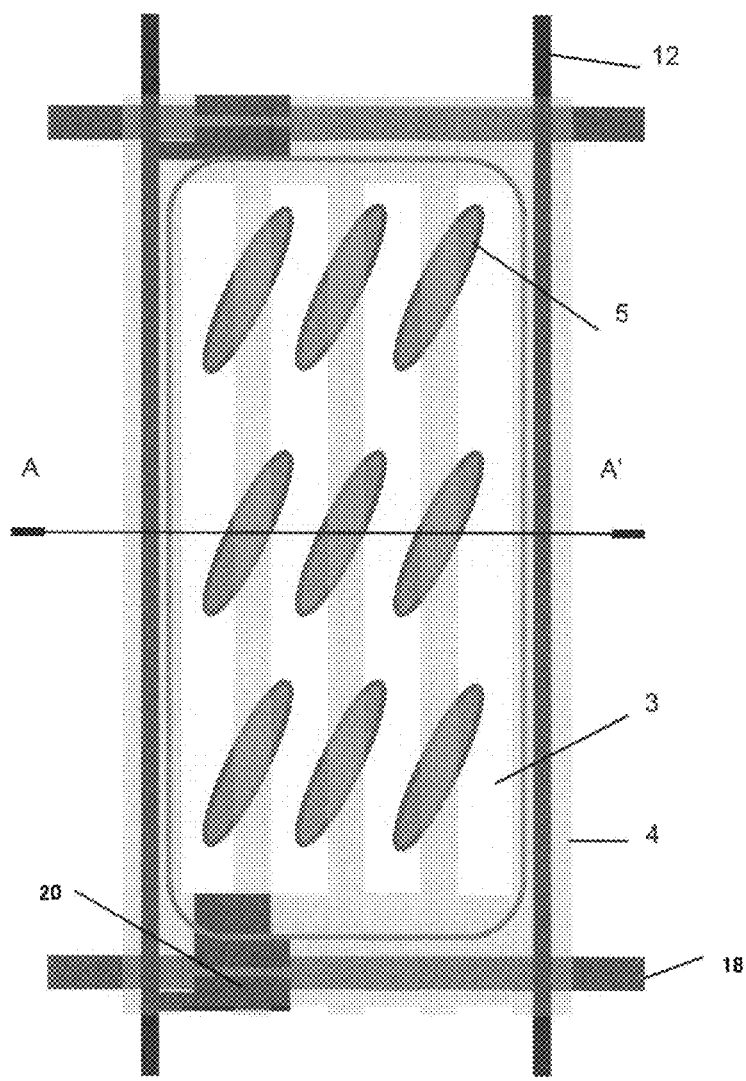
FIG. 15A is a structural view of a liquid crystal display device according to a seventh embodiment of the invention, which is a plan view of another example of the first embodiment in FFS mode.
Figure 15B:
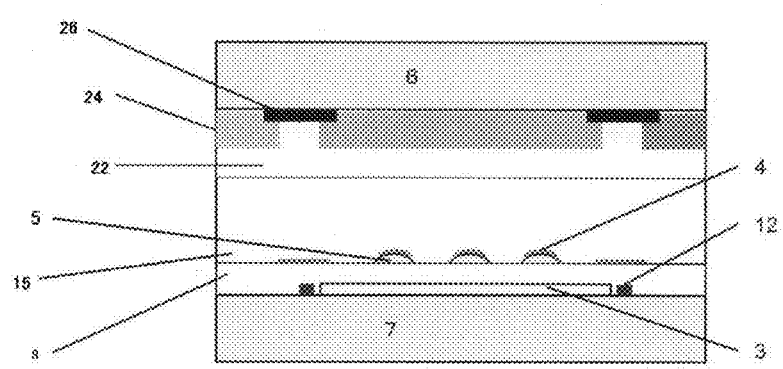
FIG. 15B is the structural view of the liquid crystal display device according to the seventh embodiment of the invention, which is an A-A cross-sectional view of the other example of the first embodiment in FFS mode.

FIG. 15A is a plan view of a horizontal electric field-driven type liquid crystal display device of fringe field switching (FFS) mode according to an embodiment of the invention, and FIG. 15B is a cross-sectional view thereof.

In a pixel region surrounded by signal lines 12 for applying a signal voltage to a pixel electrode 3 and scanning lines 18, there are provided a pixel electrode substrate 7 including the pixel electrode 3 having a planar shape and connected to a switching element 20 and one of the signal lines 12 via the switching element 20 and a contact hole, a stripe-shaped counter electrode 4 having a plurality of slits arranged in parallel above the pixel electrode 3, and a plurality of isolated convex portions 5 of an embodiment of the present invention; a counter substrate 6 provided in a position facing the pixel electrode substrate 7 and including a color filter 24, a black matrix 26, and an overcoat 22; and a liquid crystal 15 filled between the pixel electrode substrate 7 and the counter substrate 6, thereby forming a pixel. The isolated convex portions 5 are provided at a layer contacted with a liquid crystal layer of the pixel electrode substrate 7 via an alignment film (not depicted in the drawings).

A predetermined voltage is applied to the pixel electrode 3 via the switching element 20 by applying the predetermined voltage to the signal line 12 to apply the voltage for driving the switching element 20 to the scanning line 18.

Then, a voltage for turning off the switching element 20 is applied to the scanning line 18 to maintain the predetermined voltage applied to the pixel electrode 3.

When a potential difference occurs between the pixel electrode 3 and the counter electrode 4, an electric field is generated in a direction perpendicular to a direction in which the counter electrode 4 is extended in a plane substantially parallel to the pixel electrode 3. The generated electric field has a highest intensity at edge portions of the slits included in the counter electrode 4.

In addition, the direction of the electric field is generated in a direction perpendicular to an extension direction of the edge portions of the slits.

Liquid crystal molecules are rotated in a direction in which the direction of the electric field is parallel to a long axis of the molecules, as a result of which birefringence occurs, thereby allowing control of transmittance in the pixel.

Even in the structure of the preset embodiment, as in the other embodiments, the liquid crystal molecules are easily rotated in a desired liquid crystal rotation direction by arranging the longitudinal direction of the isolated convex portions 5 angularly with respect to an initial alignment direction in the same direction as the desired liquid crystal rotation direction.

While the above description has been given of the liquid crystal display device of FFS mode including the planar pixel electrode 3 and the stripe-shaped counter electrode 4, the liquid crystal display device of the present embodiment may be a liquid crystal display device of FFS mode including a stripe-shaped pixel electrode 3 and a planar counter electrode 4.

In addition, even in the present embodiment, the counter electrode 4 may be either an upper layer or a lower layer than the isolated convex portions 5.

Additionally, the isolated convex portions 5 may be arranged in a position overlapping with the counter electrode 4 or in a position between stripes of the counter electrode 4. In addition, the isolated convex portions 5 do not necessarily have to be directly provided at a layer contacted with the liquid crystal layer of the pixel electrode substrate 7 via an alignment film (not depicted in the drawings). The insulation film 8 of an uppermost layer contacted with the liquid crystal layer of the pixel electrode substrate 7 via the alignment film may be additionally provided on the isolated convex portions 5, and then the insulation film 8 of the uppermost layer may have a convex shape.

What is claimed is:

1. A liquid crystal display device comprising:
   a pixel electrode substrate including a pixel electrode and a counter electrode formed thereon;
   a counter substrate provided to face the pixel electrode substrate; and
   a liquid crystal interposed between the pixel electrode substrate and the counter substrate, the liquid crystal display device being of a mode that rotates liquid crystal molecules substantially in parallel to the pixel electrode substrate,
   wherein
   an initial alignment direction of the liquid crystal molecules is parallel to an extension direction of at least one of the pixel electrode and the counter electrode, and
   the pixel electrode substrate includes a plurality of convex portions or concave portions that each have a long and narrow shape and a curvilinear cross-sectional surface and whose longitudinal direction has an oblique angle with respect to the initial alignment direction of the liquid crystal molecules in the same direction as a desired liquid crystal rotation direction, and
   the at least one of the pixel electrode and the counter electrode crosses upper surfaces of the plurality of convex portions or concave portions facing the liquid crystal.

2. The liquid crystal display device according to claim 1, wherein the pixel electrode and the counter electrode are comb-shaped electrodes whose extension portions are parallel to each other.

3. The liquid crystal display device according to claim 1, wherein one of the pixel electrode and the counter electrode is a comb-shaped electrode and the other one thereof is a planar electrode.

4. The liquid crystal display device according to claim 1, wherein the at least one convex portion or concave portion is provided on the counter substrate.

5. The liquid crystal display device according to claim 1, wherein both of the pixel electrode substrate and the counter substrate include the plurality of convex portions or concave portions.

6. The liquid crystal display device according to claim 1, wherein the plurality of convex portions or concave portions are provided in a continuous linear shape.

7. The liquid crystal display device according to claim 1, wherein the plurality of convex portions or concave portions are formed at an insulation film of an uppermost layer on the pixel electrode substrate.

* * * * *